United States Patent
Jin et al.

(10) Patent No.: US 7,848,773 B2
(45) Date of Patent: Dec. 7, 2010

(54) MOBILE COMMUNICATION TERMINAL HAVING QWERTY KEYS AND METHOD FOR OUTPUTTING DUAL TONE MULTI-FREQUENCY SIGNAL THEREOF

(75) Inventors: Sang Hoon Jin, Suwon-si (KR); Sung Chul Yang, Yongin-si (KR); Il Seok Jang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 636 days.

(21) Appl. No.: 11/840,908

(22) Filed: Aug. 17, 2007

(65) Prior Publication Data
US 2008/0224898 A1    Sep. 18, 2008

(30) Foreign Application Priority Data
Mar. 12, 2007    (KR) .................. 10-2007-0024155

(51) Int. Cl.
*H04M 1/00* (2006.01)
(52) U.S. Cl. ............... 455/550.1; 455/566; 455/90.3
(58) Field of Classification Search ............ 455/550.1, 455/90.3, 566, 73, 556.1, 575.1; 379/433.04, 379/433.07, 433.01
See application file for complete search history.

(56) References Cited

U.S. PATENT DOCUMENTS

| | | | |
|---|---|---|---|
| 6,643,371 B2 * | 11/2003 | Mager | .................. 379/355.07 |
| 6,681,002 B2 | 1/2004 | Chang | |
| 7,401,300 B2 * | 7/2008 | Nurmi | .................. 715/866 |
| 7,642,934 B2 * | 1/2010 | Scott | ................... 341/23 |
| 2004/0189607 A1 | 9/2004 | Afanasiev | |
| 2005/0275633 A1 | 12/2005 | Varanda | |
| 2007/0082708 A1* | 4/2007 | Griffin | .................. 455/565 |
| 2007/0279256 A1* | 12/2007 | Salman et al. | ............... 341/23 |

FOREIGN PATENT DOCUMENTS

KR    10-0455168    10/2004

* cited by examiner

*Primary Examiner*—Sonny Trinh
(74) *Attorney, Agent, or Firm*—The Farrell Law Firm, LLP

(57) ABSTRACT

A mobile communication terminal having QWERTY keys and a method for outputting Dual Tone Multi-Frequency (DTMF) signals thereof are disclosed. The user inputs information including alphabetic characters that is requested by a directory system, while viewing the alphabetic characters marked on the QWERTY keys. The mobile communication terminal outputs DTMF signals of symbols marked on the input QWERTY keys identical to the DTMF signals of the corresponding symbols of keys arrayed in a conventional 3×4 key array format. The alphabetic keys of the QWERTY keys output DTMF signals identical to those of the keys of the 3×4 array format in an alphabet input mode. Therefore, the user can easily input information requested by the directory system while viewing the symbols marked on the QWERTY keys, without requiring the user to memorize the array of alphabetic characters of the 3×4 key array format.

6 Claims, 9 Drawing Sheets

MOBILE COMMUNICATION TERMINAL HAVING QWERTY KEYS AND METHOD FOR OUTPUTTING DUAL TONE MULTI-FREQUENCY SIGNAL THEREOF

PRIORITY

This application claims priority under U.S.C. §119(a) to an application entitled "MOBILE COMMUNICATION TERMINAL HAVING QWERTY KEYS AND METHOD FOR OUTPUTTING DUAL TONE MULTI-FREQUENCY SIGNAL THEREOF" filed in the Korean Intellectual Property Office on Mar. 12, 2007 and assigned Serial No. 2007-0024155, the contents of which are incorporated herein by reference.

BACKGROUND OF THE INVENTION

1. Field of the Invention

The present invention relates to a mobile communication terminal and a method for outputting signals thereof, and more particularly, to a mobile communication terminal having QWERTY keys for outputting a Dual Tone Multi-Frequency (DTMF) signal corresponding to a selected QWERTY key, and to a method for outputting the DTMF signal.

2. Description of the Related Art

FIG. 1 is a plan view partially illustrating a conventional mobile communication terminal having 3×4 keys.

As shown in FIG. 1, a typical mobile communication terminal 10 has 3×4 alphanumeric keys 7 (hereinafter '3×4 keys') may be arrayed similarly to those of a general telephone keyboard. However, many recent mobile communication terminals employ a QWERTY keypad in which alphanumeric keys are arrayed similarly to those of a keyboard for computers. In particular, mobile communication terminals, such as Personal Digital Assistants (PDA's) have adopted such a QWERTY key array.

In general, many companies and organizations administrate directory systems, such as an Automatic Response System (ARS) system, so that a user can conventionally call and connect with a person in the company on a representative phone using a mobile communication terminal.

Specifically, when the user calls the company administrating the directory system, the directory system requests an extension number or a name of person to be called from the user. When the user inputs information requested by the directory system through keys of the mobile communication terminal, the mobile communication terminal transmits Dual Tone MultiiFrequency (DTMF) signals corresponding to the input keys to the directory system. If the called person corresponding to the received DTMF signal is within the company, the directory system connects the called person's phone to the user's mobile communication terminal.

However, since the directory system is operated based on DTMF signals corresponding to 3×4 keys adopted by a general telephone, when the directory system requests alphabetic characters, such as those in an employee's name, from a user who uses a mobile communication terminal having a QWERTY keypad, the user cannot easily input the corresponding alphabetic characters through the QWERTY keypad.

Specifically, since alphabetic characters marked on the numeric keys of the QWERTY keypad are different from those of the 3×4 keypad, the user may make errors when inputting alphabetic characters while making a call. Therefore, in order to respond to the directory system's request properly, the user must memorize the array of alphabetic characters in the 3×4 keypad, which are not marked on the numeric keys of the QWERTY keypad.

As such, when a conventional mobile communication terminal having a QWERTY keypad is connected to the directory system, the user is inconvenienced when inputting information including alphabetic characters that is requested by the directory system, through the QWERTY keypad.

SUMMARY OF THE INVENTION

In order to solve the above problems, the present invention provides a mobile communication terminal having QWERTY keys and a method for outputting signals thereof that enable a user to easily input information, including alphabetic characters, that is requested by a directory system, using QWERTY keys, without requiring the user to memorize the array of alphabetic characters corresponding to keys arrayed in a 3×4 keypad.

The present invention further provides a mobile communication terminal having QWERTY keys and a method for outputting signals thereof that enable a user to easily input information including alphabetic characters that is requested by a directory system, using symbols marked on QWERTY keys.

In accordance with an aspect of the present invention, a mobile communication terminal having QWERTY keys includes a wireless communication unit for transmitting and receiving information to and from a directory system; QWERTY keys on which symbols composed of alphabetic characters and numerals are marked in a QWERTY array, for inputting a marked symbol by inputting the corresponding QWERTY key in order to input information requested by the directory system; and a controller for outputting a DTMF signal corresponding to a symbol of a key of a 3×4 key array to the directory system through the wireless communication unit, wherein a symbol of the key of the 3×4 key array is identical to the input marked symbol.

Preferably, the controller enters an alphabet input mode and a numeric input mode. The controller outputs, when entering the alphabet input mode, a DTMF signal corresponding to an alphabetic character marked on the input QWERTY key. The controller outputs, when entering the numeric input mode, a DTMF signal corresponding to a numeral marked on the input QWERTY key.

Preferably, the terminal further includes an acceleration sensor for determining a motional acceleration of the mobile communication terminal and transmitting the acceleration value to the controller, wherein the controller changes a current input mode to another input mode when the received acceleration value is greater than a predetermined acceleration value.

In accordance with another aspect of the present invention, a method for outputting DTMF signals of a mobile communication terminal having QWERTY keys includes accessing a directory system; requesting information from the directory system; selecting at least one QWERTY key on which symbols are marked, and inputting symbols corresponding to the selected QWERTY key to input response information in response to the requested information; and outputting a DTMF signal corresponding to a symbol of a key of a 3×4 key array to the directory system, wherein the symbol of the key of the 3×4 key array is identical to the input marked symbol.

In accordance with another aspect of the present invention, a method for outputting DTMF signals of a mobile communication terminal having QWERTY keys includes accessing a directory system; receiving a request for information from the directory system; displaying keys of a virtual 3×4 key array, wherein a key of the 3×4 key array is mapped to a corresponding numeric key of the QWERTY keys for inputting response information in response to the request-information; inputting the response information by selecting at least one numeric key of the QWERTY keys based on the corresponding key of the displayed virtual 3×4 keys; and outputting a DTMF signal corresponding to the selected numeric key to the directory system.

In accordance with another aspect of the present invention, a mobile communication terminal having QWERTY keys includes a case, QWERTY keys, a display, a 3×4 arrayed alphabet, and a controller. A wireless communication unit is installed within the case for transmitting and receiving information to and from a directory system; QWERTY keys for inputting response information in response to information requested by the directory system, the QWERTY keys being formed on the case and arrayed spaced apart from each other at a specific interval on the case, and including numeric keys arrayed in a 3×4 format, wherein alphabetic characters are formed on the case in a 3×4 format located adjacent to the corresponding numeric keys; a display unit installed on the case above the array of the QWERTY key; and a controller for receiving the response information input by the numeric keys selected according to the alphabetic characters arrayed in the 3×4 array format, and for outputting DTMF signals corresponding to the selected numeric keys to the directory system.

Preferably, the alphabetic characters arrayed in the 3×4 array format have a color different from a color of symbols marked on the QWERTY keys, and are translucently formed on the case.

Preferably, the color of the symbols marked on the QWERTY keys is different from a color of the case, and the color of the alphabetic characters arrayed in the 3×4 array format is similar to the color of the case.

BRIEF DESCRIPTION OF THE DRAWINGS

The above and other features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

In the following description, a mobile communication terminal refers to a mobile communication terminal having a keypad arrange with QWERTY keys.

The term "letters" refers to alphabetic characters embodied in a QWERTY-format keypad, including non-English alphabetic characters.

Figure 2:
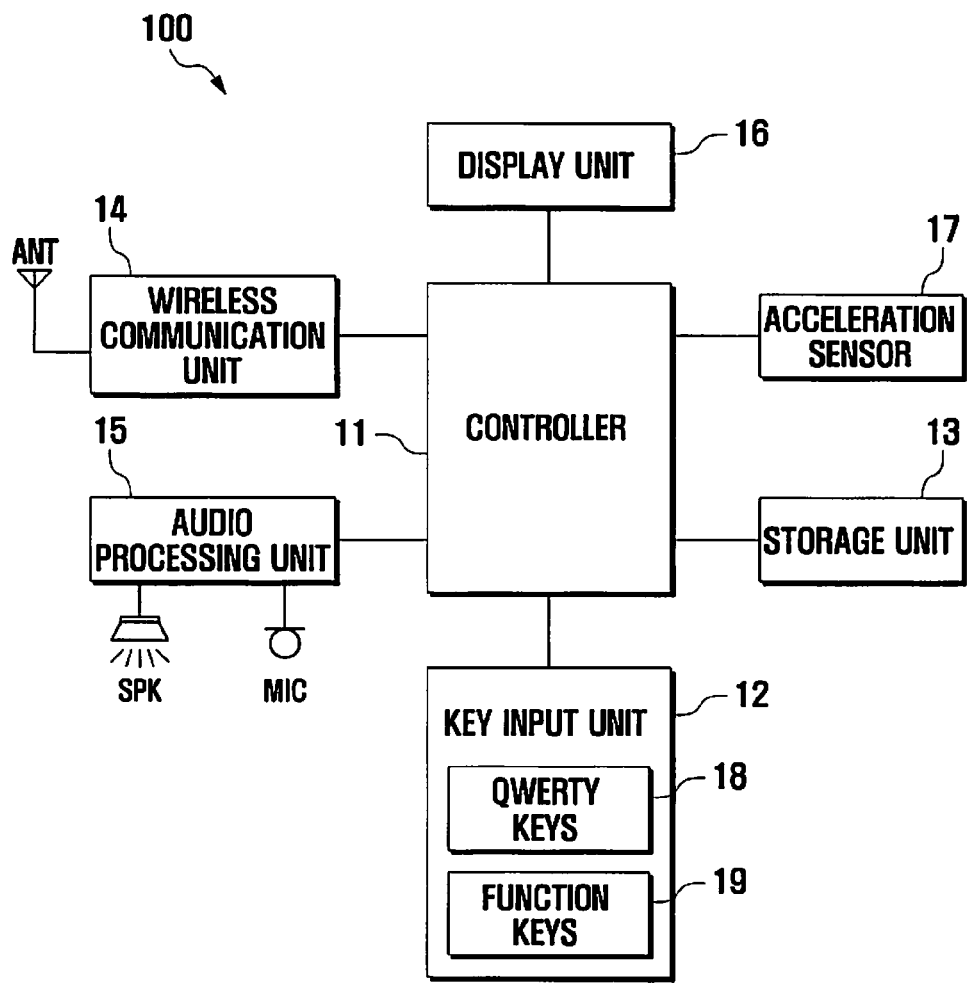
FIG. 2 is a schematic block diagram illustrating a configuration of a mobile communication terminal having QWERTY keys according to an exemplary embodiment of the present invention.
Figure 3:
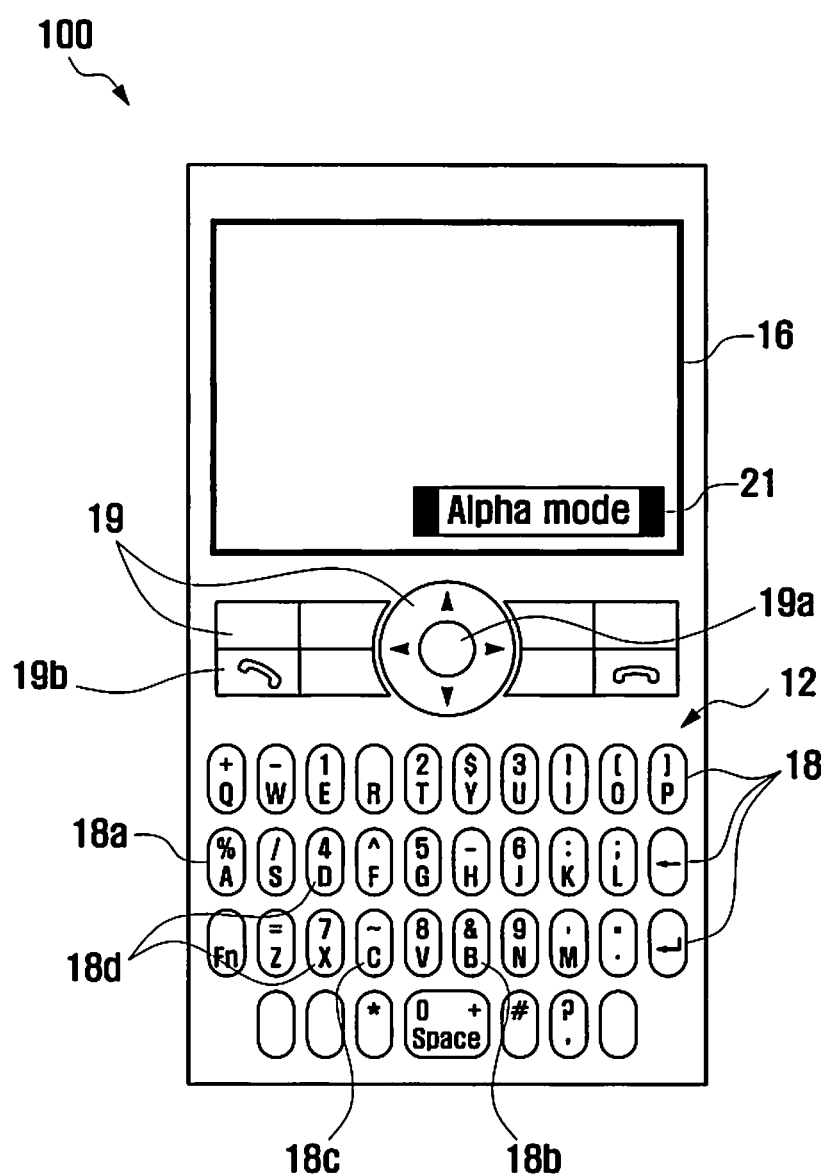
FIG. 3 is a plan view of the mobile communication terminal of FIG. 2.

FIG. 2 is a schematic block diagram illustrating a configuration of a mobile communication terminal 100 having QWERTY keys 18 according to an exemplary embodiment of the present invention. FIG. 3 is a plan view of the mobile communication terminal 100 of FIG. 2.

Referring to FIGS. 2 and 3, the mobile communication terminal 100 is configured to include a controller 11, key input unit 12 having QWERTY keys 18 and function keys 19, a storage unit 13, a wireless communication unit 14, an audio processing unit 15, a display unit 16, and an acceleration sensor 17.

The controller 11 controls the entire operation of all elements included in the mobile communication terminal 100. The controller 11 controls an output of DTMF signals according to an input mode selection. The input mode includes an alphabet input mode and numeric input mode.

The key input unit 12 includes a plurality of keys for operating the mobile communication terminal 100. The key input unit 12 generates key data corresponding to a user's selected key and outputs the key data to the controller 11. DTMF signals corresponding to symbols marked on the QWERTY keys 18 are identical to those corresponding to symbols marked on the 3×4 keys. The DTMF signals output from the QWERTY keys 18 according to an input mode are described in detail later. The function keys 19 preferably include four direction keys, a selection key 19a, a call key 19b, and other function keys, such as a hang-up key. The selection key 19a can be used to change between the alphabet input mode and the numeric input mode.

The storage unit 13 stores a program for controlling operations of the mobile communication terminal 100, and data created while the program is operated. The storage unit 13 also stores a program for outputting DTMF signals according to selection of the QWERTY keys 18.

The wireless communication unit 14 performs modulation and frequency conversion of information output from the controller 11 and transmits Radio Frequency (RF) signals through an antenna ANT. The wireless communication unit 14 also separates received signals from RF signals received by the antenna ANT and performs frequency conversion and demodulation for the received signals, and outputs the signals to the controller 11. In particular, the wireless communication unit 14 transmits and receives information to and from a directory system, i.e., the wireless communication unit 14 receives requests for information from a connected directory system and outputs the requests to the controller 11. The controller 11 then transmits response information to the directory system in response to the request-information.

Here, the response information refers to a DTMF signal corresponding to a selected QWERTY key 18.

The audio processing unit 15 digitizes voice signals input through a microphone MIC, and demodulates audio data received from the wireless communication unit 14 and outputs the data through a speaker SPK, according to the control of the controller 11. In particular, the audio processing unit 15 outputs the information requested by the directory system as a voice. Here, the requested information may be a guide message, for example "Please input an employee's name."

The display unit 16 displays, through images, data stored in the storage unit 13 as well as a variety of function menus executed in the mobile communication terminal 100. The display unit 16 may be implemented by an LCD, which may have a touch screen. The touch screen can perform both display and input.

The acceleration sensor 17 determines a motional acceleration generated by moving the mobile communication terminal 100 in a call mode and outputs the acceleration value to the controller 11. When the received acceleration is greater than a predetermined acceleration value, the controller 11 changes the current set input mode into another input mode.

Figure 1:
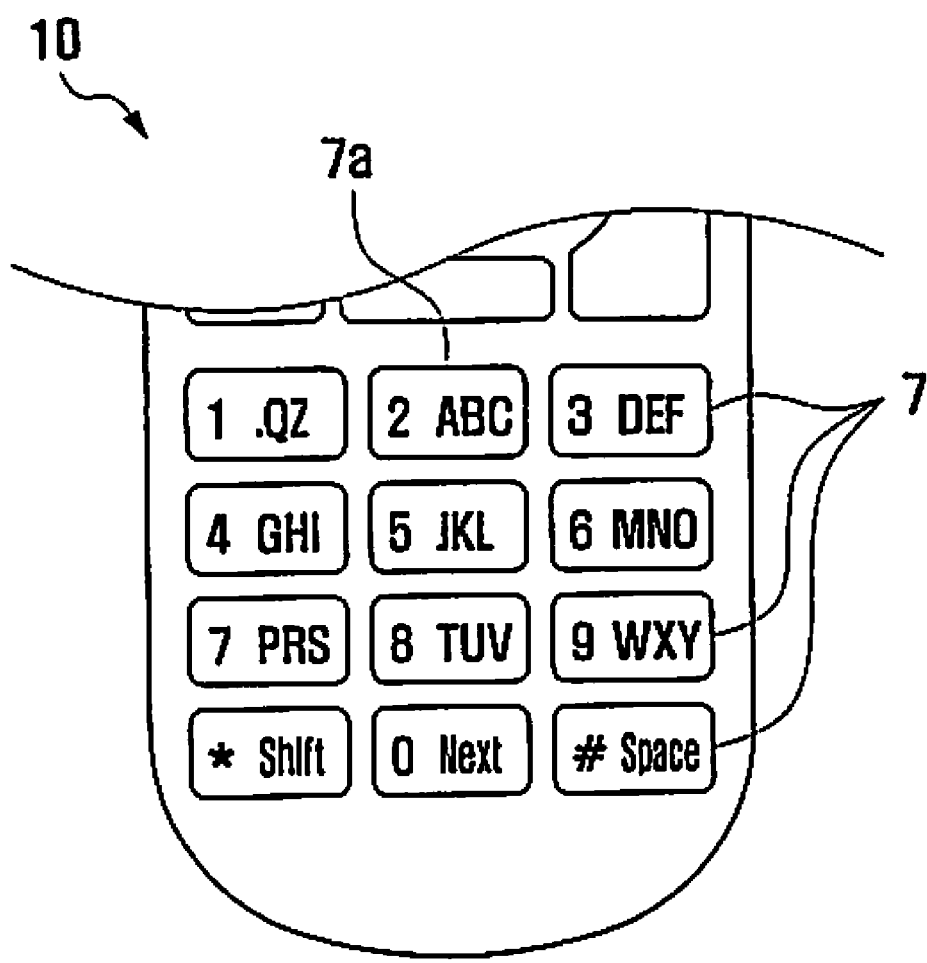
FIG. 1 is a plan view partially illustrating a conventional mobile communication terminal having 3×4 keys.

In particular, the controller 11 outputs DTMF signals according to the current set input mode, i.e., when the current set input mode is an alphabet input mode, the controller 11 outputs a DTMF signal corresponding to a specific letter marked on a selected QWERTY key 18. When a QWERTY key 18 marked with a specific letter is selected, the controller 11 outputs a DTMF signal identical to that of the corresponding key of the 3×4 marked with the same letter. For example, as shown in FIG. 1 depicting the 3×4 array keys 7, when the key 7a on which the letters "ABC" and the numerals "2" are marked is selected, a DTMF signal called "E" is assumed to be output. Using the mobile communication terminal 100 having QWERTY keys 18, according to the present invention, when any of a key 18a ('A'), key 18b ('B'), and key 18c ('C') are selected, the same DTMF signal of θ is output. In a conventional mobile communication terminal having QWERTY keys, however, when any of a key 'A', key 'B', and key 'C' are selected, the DTMF signal θ is not output.

Further, when the current set input mode is a numeric input mode, the controller 11 outputs a DTMF signal generated by only the numeric keys 18d of the QWERTY keys 18. Here, the array of the numeric keys 18d of the QWERTY keys 18 is the same as that of the 3×4 keys. Also, the key of a numeral from the QWERTY keys 18 and the key of the same numeral from the 3×4 keys output the same DTMF signal.

As described above, the mobile communication terminal 100 according to this exemplary embodiment of the present invention is implemented in such a way that the input mode can be changed according to a selection of the selection key 19a or to an acceleration determined by the acceleration sensor 17. However, in another embodiment, the mobile communication terminal 100 can be modified to have only one of the functions for changing the input mode.

The following description of a method for outputting DTMF signals of the mobile communication terminal 100 according to another exemplary embodiment of the present invention describes the configuration of the mobile communication terminal 100 in more detail.

Figure 4:
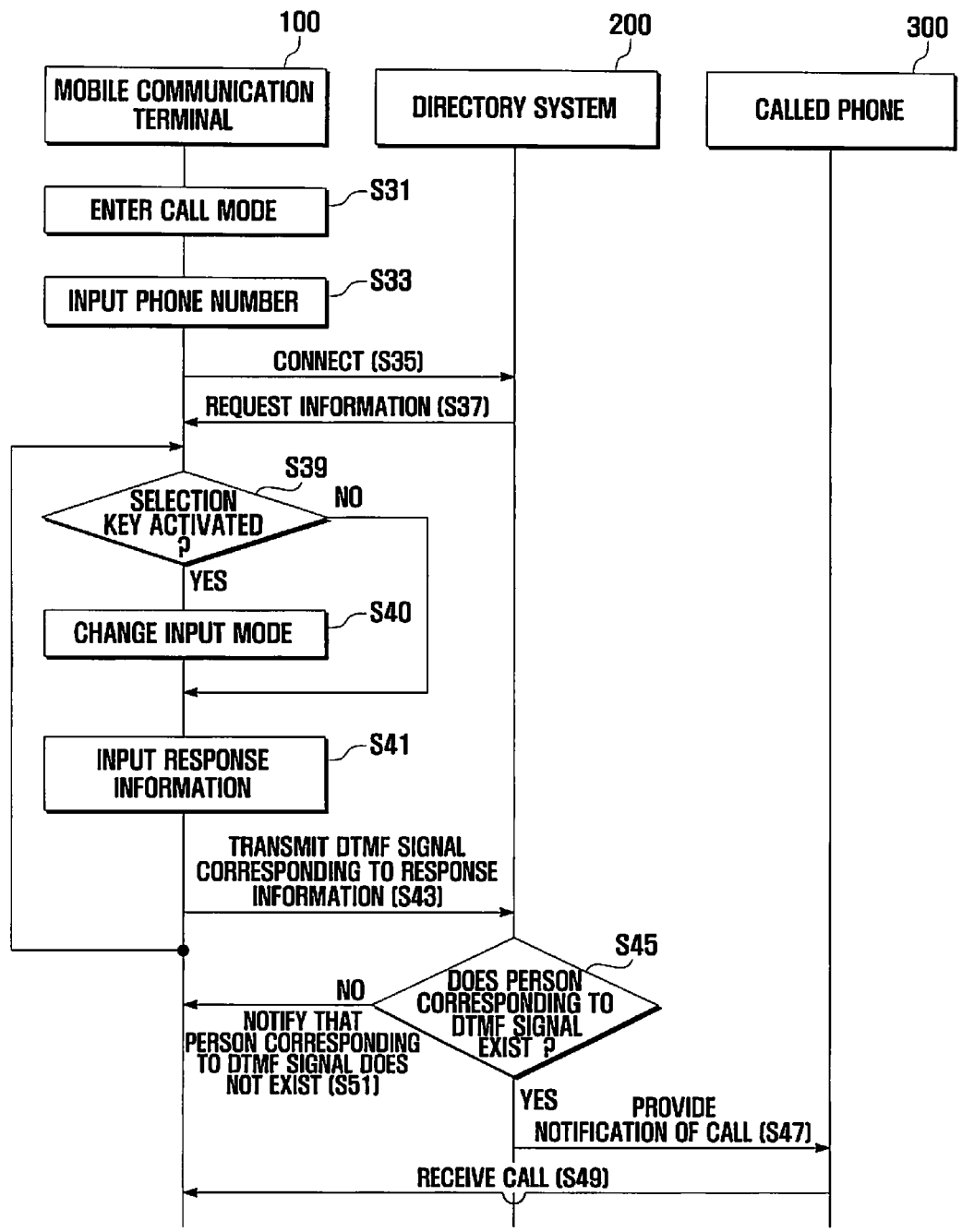
FIG. 4 is a flow chart illustrating a method for outputting a DTMF signal of a mobile communication terminal having QWERTY keys according to another exemplary embodiment of the present invention.

Referring now to FIGS. 2 to 4, when a user selects the call key 19b, the controller 11 enters a call mode, in step S31. In this case, the controller 11 enters a numeric input mode.

When the user inputs a phone number of an organization with a directory system 200 through a key input, in step S33, the controller 11 tries to access the directory system 200 of the organization corresponding to the input phone number, in step S35.

When the mobile communication terminal 100 is connected to the directory system 200, the directory system 200 requests necessary information from the mobile communication terminal 100, in step S37. Here, request-information requests at least one letter as response-information. For example, the request-information may be a guide message, such as "Please input a name of an employee."

Next, the controller 11 determines whether the selection key 19a is activated to change the current mode to another input mode, in step S39. If the selection key 19a is activated, the controller 11 changes the current numeric input mode to an alphabet input mode, in step S40. However, when the selection key 19a is not activated at step S39, the controller 11 maintains the numeric input mode as the current input mode.

The mobile communication terminal 100 according to this embodiment of the present invention is implemented in such a way that the input mode is changed to another input mode by a selection of the selection key 19a. However in another embodiment the input mode may be changed to another input mode by moving the mobile communication terminal 100 at an acceleration greater than a predetermined acceleration value. For example, if the mobile communication terminal 100 is shaken in up-and-down or side-to-side directions such that the acceleration sensor 17 determines that the generated acceleration is greater than the predetermined acceleration value, the acceleration sensor 17 informs the controller 11, and the controller 11 changes the current input mode to another input mode.

When the numeric input mode is changed to the alphabet input mode, the controller 11 displays that the current input mode is the alphabet input mode on the display unit 16. For example, the display unit 16 may display 'Alpha mode' 21. When the current input mode is changed to the numeric input mode, the display unit 16 displays the numeric input mode.

For example, when the request-information is a guide message "Please input a name of an employee," the user changes the current set numeric input mode to the alphabet input mode.

Next, the user inputs response information in response to the request-information through the QWERTY keys 18, in step S41. The controller 11 transmits a DTMF signal corresponding to the response information to the directory system 200, in step S43. Here, the response information is composed of at least one of the symbols marked on the QWERTY keys 18, as selected by the user. The symbols include at least one letter.

In particular, the user inputs letters of the response information in the set input mode while viewing the letters marked on the QWERTY keys 18. Therefore, when using the mobile communication terminal 100 having QWERTY keys according to the present invention, the user does not need to memorize the alphabetic array of the 3×4 keys. However, when using the conventional mobile communication terminal, the user must memorize the alphabetic array of the 3×4 keys.

For example, when the request-information is a guide message "Please input a name of an employee," the user inputs a name in the alphabet input mode. The controller 11 outputs DTMF signals corresponding to letters forming the employee's name. The DTMF signals output from the controller 11 are transmitted to the directory system 200 through the wireless communication unit 14.

When the response-information intended to be input is composed only of letters, the user inputs the letters in the alphabet input mode at step S41. If, however, the response information to be input is composed both of letters and numerals, the user repeats steps S39 to S43 to change between the alphabet input mode and the numeric input mode according to the input characters.

Next, the directory system 200 determines whether a person corresponding to the received DTMF signals exists, in step S45. If the person is determined to exist, the directory system 200 informs the called person's phone 300 that a call is received, in step S47. The called person may then receive the call, while called person phone 300 is connected to the user's mobile communication terminal 100, in step S49, or may return the call at another time.

If the directory system 200 determines that the called person does not exist at step S45, the directory system 200 informs the mobile communication terminal 100 that the employee does not exist. For example, the directory system 200 can transmit a guide message "An employee with the name that you input does not exist" to the mobile communication terminal 100.

Figure 5:
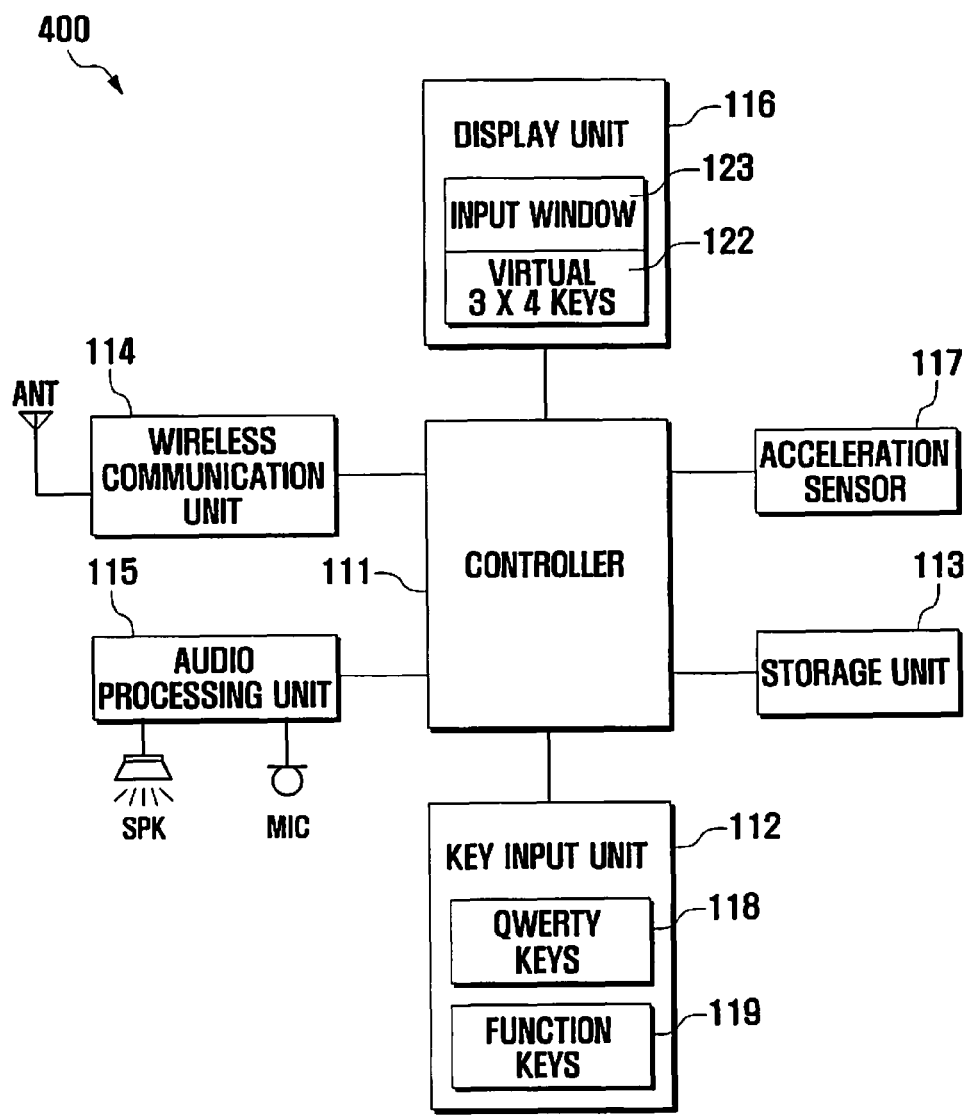
FIG. 5 is a schematic block diagram illustrating a configuration of a mobile communication terminal having QWERTY keys according to another exemplary embodiment of the present invention.
Figure 6:
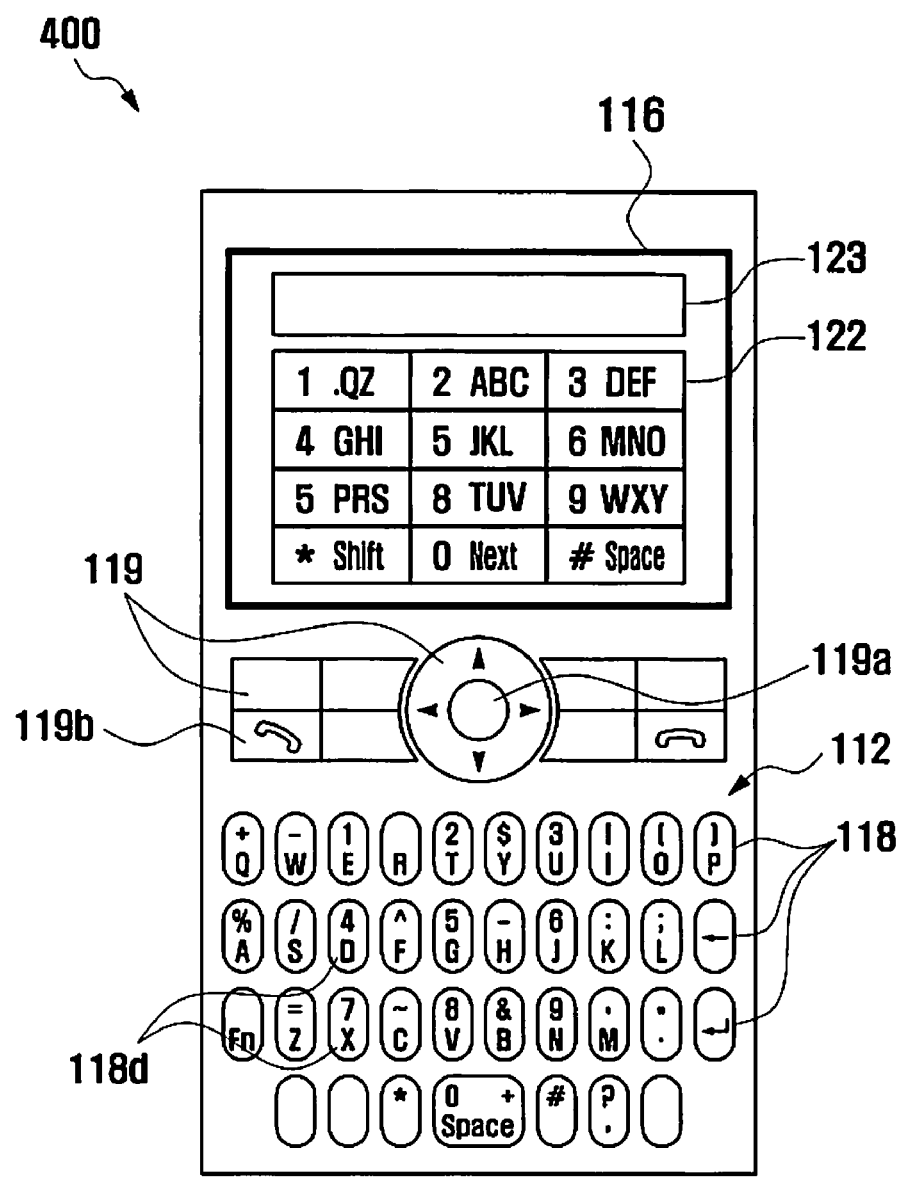
FIG. 6 is a plan view of the mobile communication terminal of FIG. 5.

Referring to FIGS. 5 and 6, the mobile communication terminal 400 is configured to include a controller 111, a key input unit 112 having QWERTY keys 118 and function keys 119, a storage unit 113, a wireless communication unit 114, an audio processing unit 115, a display unit 116, and an acceleration sensor 117.

The controller 111 controls the entire operation of all elements included in the mobile communication terminal 400. The controller 111 controls output of DTMF signals according to input mode selection.

The key input unit 112 includes a plurality of keys for operating the mobile communication terminal 400. The key input unit 112 generates key data corresponding to a user's selected key and outputs the key data to the controller 111. Numeric keys of QWERTY keys 118, which have a 3×4 key array format, output DTMF signals corresponding to a 3×4 keypad in a call mode. The function keys 119 include four direction keys, a selection key 119a, a call key 119b, and other function keys such as a hang-up key. The selection key 119a can be used to change between the alphabet input mode and the numeric input mode.

The storage unit 113 stores a program for controlling operations of the mobile communication terminal 400 and stores data created while the program is operated. The storage unit 113 also stores a program for displaying virtual 3×4 keys 122 on the display unit 116 according to selection of the selection key 119a. The wireless communication unit 114 performs modulation and frequency conversion of information output from the controller 111 and transmits Radio Frequency (RF) signals through an antenna ANT. The wireless communication unit 114 also separates received signals from RF signals received by the antenna ANT and performs frequency conversion and demodulation for the received signals, and outputs the signals to the controller 111. In particular, the wireless communication unit 114 transmits and receives information to and from a directory system, i.e., the wireless communication unit 114 receives requests for information from a connected directory system and outputs the requests to the controller 111. The controller 111 then transmits response information in response to the request-information to the directory system.

The audio processing unit 115 digitizes audio signals input through a microphone MIC, and demodulates audio data received from the wireless communication unit 114 and outputs the data through a speaker SPK, according to the control of the controller 111. In particular, the audio processing unit 115 outputs the information requested by the directory system as a voice. Here, the requested-information may be a guide message, for example "Please input an employee's name."

The display unit 116 displays, through images, data stored in the storage unit 113 as well as a variety of function menus executed in the mobile communication terminal 400. The display unit 116 may be implemented by an LCD, which may have a touch screen. The touch screen can perform both a display function and an input function. The display unit 116 also displays the virtual 3×4 keys 122, and an input window 123 for displaying letters input by selecting the virtual 3×4 keys 122. For example, the display unit 116 displays the virtual 3×4 keys 122 and the input window 123 such that the input window 123 is positioned above the virtual 3×4 keys 122. In this embodiment of the present invention, the display unit 116 displays both the virtual 3×4 keys 122 and the input window 123. However, in another embodiment, the display unit 116 may display only the virtual 3×4 keys 122.

The acceleration sensor 117 determines a motional acceleration generated by moving the mobile communication terminal 400 in a call mode and outputs the acceleration value to the controller 111. When the received acceleration value is greater than a predetermined acceleration value, the controller 111 changes the current set input mode into another input mode.

In particular, when a selection signal is input for the controller 111 to change a numeric input mode to an alphabet input mode, the controller 111 displays the virtual 3×4 keys 122 on the display unit 116. The selection signal is input from the selection key 119a or the acceleration sensor 117. When a selection signal is input to the controller 111 to change the alphabet input mode to the numeric input mode, the controller 111 hides the displayed virtual 3×4 keys 122.

The virtual 3×4 keys 122 have the same key array as the conventional 3×4 keys. Further, the virtual 3×4 keys 122 are mapped to the corresponding numeric keys 118d of the QWERTY keys 118. Therefore, the user can select the numeric keys 118d of the QWERTY keys 118 while viewing the letters of the virtual 3×4 keys 122 displayed on the display unit 116, thereby easily inputting response information including letters that is requested by the directory system.

When the display unit 116 is used as a touch screen, the user can directly select the 3×4 keys 122 displayed thereon, thereby easily inputting response information, including letters requested by the directory system.

Figure 7:
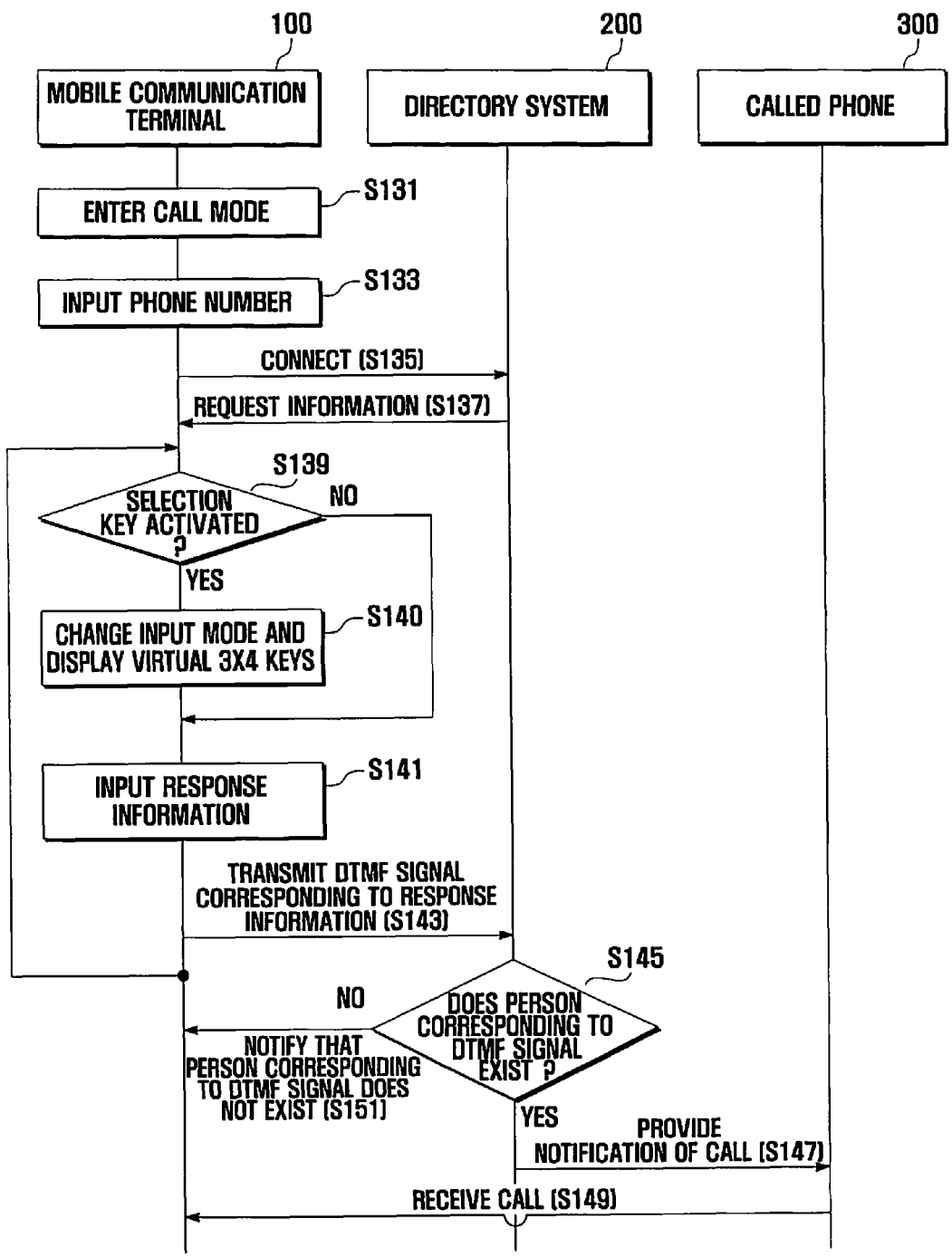
FIG. 7 is a flow chart illustrating a method for outputting a DTMF signal of a mobile communication terminal having QWERTY keys according to another exemplary embodiment of the present invention.

Referring now to FIGS. 5 to 7, when a user selects the call key 119b, the controller 111 enters a call mode, in step S131. Here, the controller 111 enters a numeric input mode.

When the user inputs a phone number of an organization with a directory system 200 through key input, in step S133, the controller 111 tries to access the directory system 200 of the organization corresponding to the input phone number, in step S135.

When the mobile communication terminal 400 is connected to the directory system 200, the directory system 200 requests necessary information from the mobile communication terminal 400, in step S137. Here, the request-information requests at least one letter as response information. For example, the request-information may be a guide message, such as "Please input a name of an employee."

Next, the controller 111 determines whether the selection key 119a is activated to change the current mode to another input mode, in step S139. If the selection key 119a is activated, the controller 111 changes the current numeric input mode to an alphabet input mode and displays the virtual 3×4 keys 122 on the display unit 116, in step S140. For example, if the request-information is a guide message "Please input the name of an employee," the user changes the current set numeric input mode to the alphabet input mode.

If the selection key 119a is not activated at step S139, the controller 111 maintains the numeric input mode as the current input mode.

The mobile communication terminal 400 in this embodiment of the present invention is implemented in such a way that the input mode is changed to another input mode by selection of the selection key 119a. However, in another embodiment, the input mode may be changed to another input mode by moving the mobile communication terminal 400 at an acceleration greater than a predetermined acceleration value. For example, if the mobile communication terminal 400 is shaken in up-and-down or side-to-side directions such that the acceleration sensor 117 determines that the generated acceleration is greater than the predetermined acceleration value, the acceleration sensor 117 informs the controller 111, and the controller 111 changes the current input mode to another input mode.

Next, the user inputs response information in response to the request-information through the numeric keys 118d of the QWERTY keys 118 while viewing the letters of the virtual 3×4 keys 122 displayed on the display unit 116, in step S141. The controller 111 transmits DTMF signals corresponding to the response information to the directory system 200, in step S143. Here, the response information includes at least one letter selected by the user, and is displayed on the input window 123.

As such, since the user inputs the response information by selecting the numeric keys 118d of the QWERTY keys 118 while viewing the letters of the virtual 3×4 keys 122 displayed on the display unit 116, the user does not have to memorize the alphabetic array of the 3×4 keys. However, in the case of using the conventional mobile communication terminal, the user must memorize the alphabetic array of the 3×4 keys.

For example, when the request-information is a guide message "Please input a name of an employee," the user inputs the name in the alphabet input mode while viewing the letters of the virtual 3×4 keys 122 on the display unit 116. The controller 111 outputs DTMF signals corresponding to letters forming the employee's name. The DTMF signals output from the controller 111 are transmitted to the directory system 200 through the wireless communication unit 114.

When the response information intended to be input is composed only of letters, the user inputs the letters in the alphabet input mode at step S141. If, however, the response information to be input is composed both of letters and numerals, the user repeats steps 139 to 143 to change between the alphabet input mode and numeric input mode according to the input characters.

Next, the directory system 200 determines whether a person corresponding to the received DTMF signals exists, in step S145. If the person is determined to exist, the directory system 200 informs the called person's phone 300 that a call is received, in step S147. The called person may than receive the call while the called person's phone 300 is connected to the user's mobile communication terminal 400, in step S149, or may return the call at another time.

If the directory system 200 determines that the called person does not exist at step S145, the directory system 200 informs the mobile communication terminal 400 that the employee does not exist. For example, the directory system 200 can transmit a guide message "An employee with the name that you input does not exist" to the mobile communication terminal 400.

In this embodiment of the present invention the display unit 116 displays the virtual 3×4 keys 122 only in the alphabet input mode. However, in another embodiment, the display unit 116 may continue to display the virtual 3×4 keys 122 while in the numeric input mode, i.e., the user can input at least one numeral for the response information while viewing the numeral and letters displayed on the virtual 3×4 keys 122 and the numeral or letters marked on the numeric keys 118d of the QWERTY keys 118.

Figure 8:
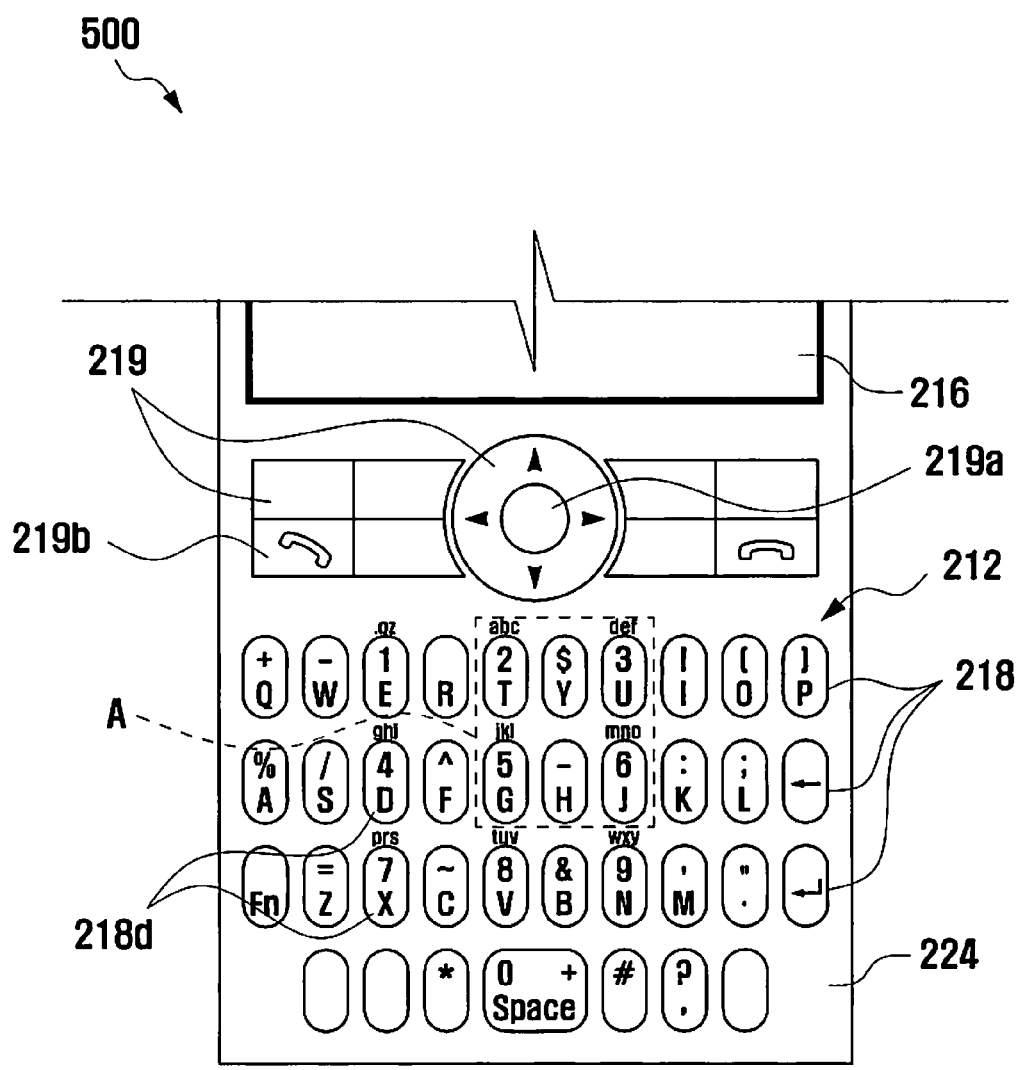
FIG. 8 is a plan view illustrating a mobile communication terminal having QWERTY keys according to another exemplary embodiment of the present invention.
Figure 9:
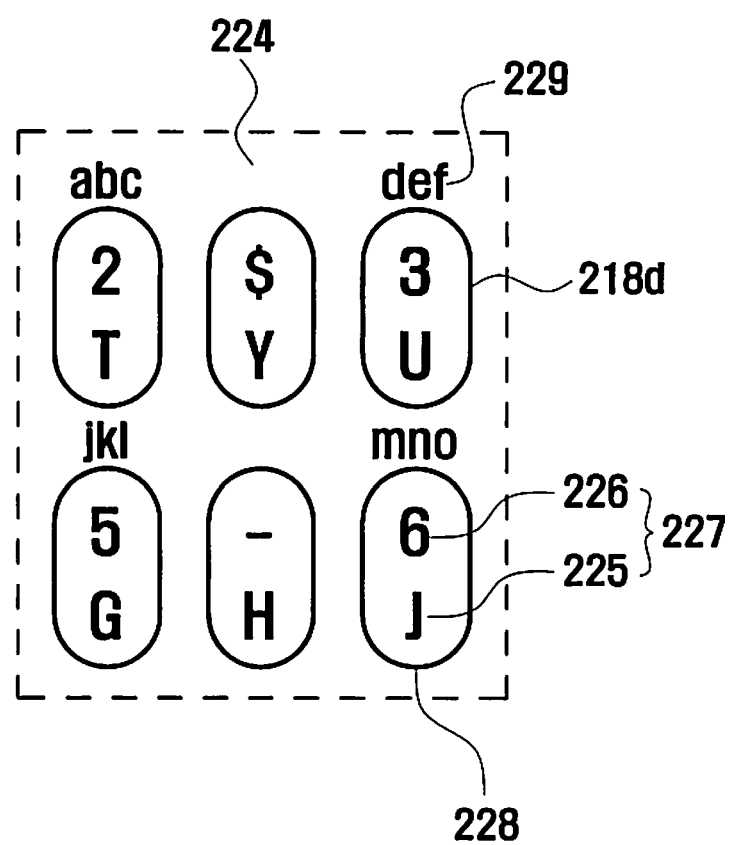
FIG. 9 is an enlarged view illustrating portion A of the mobile communication terminal of FIG. 8.

Referring to FIGS. 8 and 9, the mobile communication terminal 500 is configured to include a key input unit 212 having QWERTY keys 218 and function keys 219, and a display unit 216 installed on a case 224 above the key input unit 212.

The QWERTY keys 218 are arrayed, spaced apart from each other, at a specific interval on the case 224. The QWERTY keys 218 have first alphabetic characters 225 marked thereon. The numeric keys 218d of the QWERTY keys 218, which have a 3×4 array format, have both the first alphabetic characters 225 and numerals 226 marked thereon. The numeric keys 218d output DTMF signals corresponding to 3×4 keys in a call mode.

Symbols 227 marked on the QWERTY keys 218 have various colors to be readily discernible. For example, the symbols 227 may have a bright color, such as white, to be prominent, even without light emitted by a light emitting body within the case 224. The QWERTY keys 218 are manufactured in such a way that a key body 228 of each QWERTY key 218 is opaque and each symbol 227 is transparent. If the symbols 227 have a bright color, the key body 228 may have a dark color. Therefore, the user can easily read the symbols 227 marked on the QWERTY keys 218 by the naked eye. Further, since only the symbols 227 of the key body 228 allow light to pass through, they can have particular prominence from the key body 228 through light emitted by a light emitting body installed within the case 224.

The function keys 219 include four direction keys, a selection key 219a, a call key 219b, and other functions such as a hang-up key.

In particular, second alphabetic characters 229 identical to the alphabetic characters marked on corresponding 3×4 keys are formed adjacent to the numeric keys 218d on the case 224. The second alphabetic characters 229 are formed adjacent the top portion of the numeric keys 218d. The second alphabetic characters 229 are printed or formed in a similar manner to the symbols 227.

The second alphabetic characters 229 are formed to have a color different from that of the symbols 227 marked on the QWERTY keys 218, i.e., the second alphabetic characters 229 are formed on the case 224 to be translucent and to have a color similar to that of the case 224. Therefore, the second alphabetic characters 229 are not prominent from the case 224 when light is not emitted from a light emitting body within the case 224, i.e., the second alphabetic characters 229 become apparent when the light emitting body emits light. Nevertheless, since the second alphabetic characters 229 have a color different from that of the symbols 227 marked on the QWERTY keys 218, the second alphabetic characters 229 can be easily differentiated from the first alphabetic characters 225, when the light emitting body does not emit light.

Although not shown in FIGS. 8 and 9, the mobile communication terminal 500 of this exemplary embodiment of the present invention includes further elements installed in the case 224 that are similar to corresponding elements of the mobile communication terminals 100 and 400, such as a controller, storage unit, wireless communication unit, audio processing unit, and acceleration sensor The wireless communication unit transmits and receives information to and from a directory system in a communication mode. The controller receives response information from the numeric keys 218*d* selected by the user based on the second alphabetic characters 229 in response to a request for information from the directory system, and transmits DTMF signals corresponding to the selected numeric keys 218 to the directory system.

In a method for outputting DTMF signals from the mobile communication terminal 500 of this exemplary embodiment of the present invention, when a user selects numeric keys 218*d* corresponding to letters in a communication mode while viewing the second alphabetic characters 229, the controller outputs DTMF signals corresponding to the selected numeric keys 218*d* to the directory system.

Therefore, the user can easily input response information, including letters, that is requested by the directory system, while viewing the second alphabetic characters 229 formed on the case 224 to which the QWERTY keys 218 are installed.

As described in the foregoing, the present invention has the following advantages:

According to an exemplary embodiment of the present invention, since the mobile communication terminal outputs DTMF signals of symbols marked on the QWERTY keys thereof, identical to the DTMF signals of corresponding symbols of conventional 3×4 keys, a user does not need to memorize the 3×4 key array, but instead can easily input response information while viewing the symbols marked on the QWERTY keys.

According to another exemplary embodiment of the present invention, a user can easily input response information, including letters, that is requested by a directory system, as the user selects numeric keys of QWERTY keys while viewing alphabetic characters of virtual 3×4 keys displayed on the display.

According to another exemplary embodiment of the present invention, a user can easily input response information, including letters, that is requested by a directory system, as the user selects numeric keys of QWERTY keys while viewing the second alphabetic characters formed adjacent to the numeric keys of the QWERTY keys.

The mobile communication terminal having QWERTY keys according to the present invention allows a user to easily input response information including at least one letter that is requested by a directory system.

Although exemplary embodiments of the present invention have been described in detail hereinabove, it should be understood that many variations and modifications of the basic inventive concept herein described, which may appear to those skilled in the art, will still fall within the sprit and scope of the present invention as defined in the appended claims.

What is claimed is:

1. A mobile communication terminal having QWERTY keys, the mobile communication terminal comprising:
   a case;
   a wireless communication unit installed within the case, for transmitting and receiving information to and from a directory system;
   a QWERTY keypad comprising a plurality of QWERTY keys on which alphabetic characters are marked keypad being formed on the case;
   a display unit installed on the case above the QWERTY keypad; and
   a controller for controlling the wireless communication unit to output DTMF signals to the directory system in response to input by the QWERTY keypad,
   wherein some of the plurality of QWERTY keys are keys on which both an alphabetic character and a numeral are marked as numeral marked QWERTY keys, with the numeral marked QWERTY keys formed in 3×4 array format, and a plurality of additional alphabetic characters arc marked adjacent to each numeral marked QWERTY key, and
   wherein the controller receives response information input by the numeral marked QWERTY keys selected according to the additional alphabetic characters marked adjacent to the numeral marked QWERTY keys and controls the wireless communication unit to output DTMF signals to the directory system corresponding to the selected numeral marked QWERTY keys.

2. The terminal of claim 1, wherein information is requested by the directory system and comprises at least one alphabetic character.

3. The terminal of claim 2, wherein the alphabetic characters arrayed in the 3×4 array format have a color different from a color of symbols marked on the QWERTY keys, and are translucently formed on the case.

4. The terminal of claim 3, wherein:
   the color of the symbols marked on the QWERTY keys is different from a color of the case; and the color of the alphabetic characters arrayed in the 3×4 array format is similar to the color of the case.

5. The terminal of claim 1, wherein each QWERTY key marked with a numeral is not adjacent to another QWERTY key marked with a numeral on all sides thereof.

6. The terminal of claim 1, wherein only a symbol on the at least one numeral marked key of the QWERTY keys allows light to pass through, thereby creating particular prominence of the symbol from a body of the at least one numeral marked key of the QWERTY keys.

* * * * *